Aug. 7, 1962  H. O. ENGLAND  3,048,646
BATTERY TERMINAL
Filed Nov. 28, 1958

INVENTOR:
HUGO. O. ENGLAND.
by
Fetherstonhaugh & Kent
HIS ATT'YS.

United States Patent Office 3,048,646
Patented Aug. 7, 1962

3,048,646
BATTERY TERMINAL
Hugo O. England, 1752 Arthur St., Regina,
Saskatchewan, Canada
Filed Nov. 28, 1958, Ser. No. 777,079
3 Claims. (Cl. 136—135)

My invention relates to new and useful improvements in battery terminals, particularly battery terminals adapted to be used on storage batteries in cars, trucks and the like, which are provided with an upstanding cylindrical battery post.

Many ways have been devised to attach battery cables to the terminal posts of car batteries and the like, the most common of which is a split sleeve tightened around the post by means of a nut and bolt which draws the ends of the split together. Another method utilizes a solid terminal with a screw extending diagonally through the wall of the terminal so that the point of the screw engages the post. This is exemplified by Patent No. 2,269,296.

However, it is well known that the average car or truck battery corrodes badly at the terminal and all of these conventional battery terminals suffer from the disadvantage that they are extremely difficult to remove when corroded, so much so that they are often broken during removal.

My device overcomes these disadvantages by providing a solid terminal apertured to fit over the battery post and having a drilling through the body portion of the terminal which breaks through into the central aperture, so that when a screw is inserted in the drilling, part of the screw bites into the side of the battery post.

The principal object of my invention is, therefore, to provide a device of the character herewithin described which gives a positive mechanical and electrical connection between the battery terminal and post without the use of tools.

Another object of my invention is to provide a device of the character herewithin described which is extremely simple to install and remove irrespective of the corrosion that may have occurred.

A yet further object of my invention is to provide a device of the character herewithin described which, if bad corrosion takes place thus destroying the electrical connection, one turn of the screw gives a new contact along the length of the screw between the terminal and the post.

A yet further object of my invention is to provide a device of the character herewithin described which is extremely simple in construction, economical in manufacture, and otherwise well suited for the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
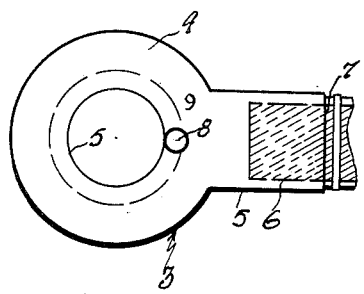
FIGURE 1 is a top plan view of my terminal per se, specifically designed for the positive terminal.
Figure 2:
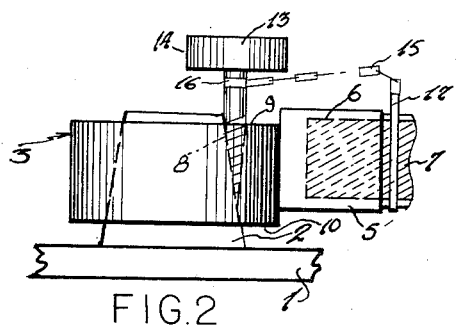
FIGURE 2 is a side elevation of FIGURE 1 but showing the device in situ.

Proceeding therefore to describe my invention in detail, reference should first be made to FIGURES 1 and 2, in which I have shown part of the upper surface 1 of a battery, having the post 2 extending upwardly therefrom.

This post, which is usually cylindrical, tapers inwardly from the base to the upper end but it will be appreciated that a straight sided cylindrical post could be used.

The terminal collectively designated 3, comprises a cylindrical body portion 4, apertured centrally as at 5, the configuration of the aperture corresponding to the configuration of the post 2 so that they nest one upon the other when in place.

A cable connecting portion 5' is formed integrally with the body portion 4 and extends to one side thereof, said cable connecting portion being cylindrical and having a blind aperture 6 therein adapted to receive the end 7 of the cable which is swaged or soldered therein for good mechanical and electrical connection.

A drilling 8 is formed in the body portion extending from the upper surface 9 thereof to adjacent the lower portion 10, said drilling being conical or tapered from the upper end towards the lower end thereof when viewed in side elevation and tapering in a direction opposite to the post 2.

Figure 5:
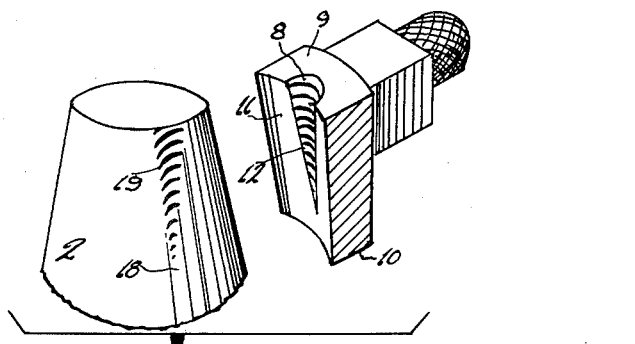
FIGURE 5 is fragmentary perspective view of a portion of the inside of the aperture and part of the post showing the relationship between the screw threaded drilling and the post.

Reference to the drawings will show that this drilling breaks through the wall 11 of the aperture 5 as at 12, said break through extending the full length of the drilling and it will also be observed from FIGURE 5 that this drilling is screw threaded to receive the securing bolt 13. This bolt or screw, which is also conical or tapered when viewed in side elevation, is complementary to the drilling 12 and is adapted to engage therewith. The head 14 of the bolt, may either be knurled as illustrated, or in the form of a wing nut, so that it can readily be manipulated by hand.

In order to prevent accidental displacement of the bolt while the terminal is disconnected from the post, I have provided a flexible link 15 secured by the end 16 thereof to the bolt 13 and by the other end thereof to a spring clip 17 which snaps around the end 7 of the associated cable.

In operation, the terminal is placed upon the post 2 whereupon the bolt 13 is screwed downwardly within the drilling 12.

Due to the fact that the drilling breaks through onto the wall 11 of the aperture 5, one side of the threads of the bolt 13 engage the side 18 of the post and cut a series of serrations 19 therein.

Not only is a wedging action provided by the insertion of the bolt but also a screw threaded cooperation between the bolt and the wall 18 of the post occurs so that a strong electrical and mechanical connection is made between the terminal and post which cannot be removed unless the bolt is unscrewed.

Figure 3:
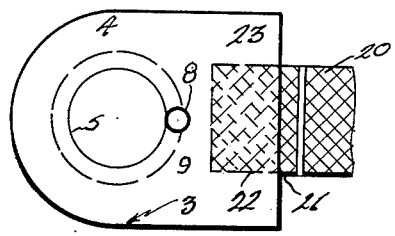
FIGURE 3 is a top plan view of a terminal designed for a ground strap.
Figure 4:
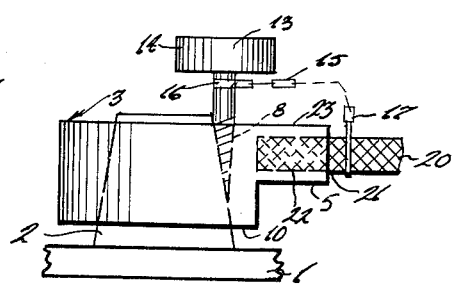
FIGURE 4 is a side elevation of FIGURE 3 but showing my device in situ.

FIGURES 3 and 4 show a similar device specifically adapted for use with a ground strap 20. In this case the body portion and cable connector are formed integrally with the end 21 of the strap being inserted within an elongated slot 22 in the cable connector 23, and as the remainder of the construction is similar to that described in FIGURES 1 and 2, corresponding reference characters have been given.

From the foregoing it will be appreciated that if bad corrosion occurs between the terminal and post, a single turn of the screw 13 will cause the side of the screw to bite more firmly into the battery post thus giving a new electrical connection from the bottom of the drilling, the screw and battery post.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A battery post clamp for storage batteries used on cars, trucks and the like, which include an upstanding cylindrical battery post; said post clamp comprising in combination a body portion centrally apertured to fit over said post, and a cable connector integral therewith and extending from one side thereof, means to detachably secure said post clamp to said post consisting of a tapered screw threaded drilling through said body portion substantially parallel to said aperture, said drilling breaking through to said aperture from top to bottom of said drilling, and a correspondingly tapered screw adapted to engage said screw threaded drilling whereby part of the side of said screw engages the side of said post.

2. The device according to claim 1 in which said post tapers inwardly from the base thereof to the upper end thereof, said aperture being correspondingly tapered, said drilling being tapered, when viewed in side elevation, in a direction opposite to that of said post, said screw having a configuration adapted to be received within said tapered drilling.

3. The device according to claim 2 which includes means to secure said screw to the associated cable comprising a flexible link secured by one end thereof to said screw and by the other end thereof to said cable.

References Cited in the file of this patent

UNITED STATES PATENTS

| | | |
|---|---|---|
| 1,017,371 | Beck | Feb. 13, 1912 |
| 1,470,433 | Fretschel | Oct. 9, 1923 |
| 1,507,936 | Schmitt | Sept. 9, 1924 |
| 2,034,843 | Von Hagel | Mar. 24, 1936 |

FOREIGN PATENTS

| | | |
|---|---|---|
| 418,042 | Great Britain | Oct. 17, 1934 |
| 740,843 | France | Nov. 21, 1932 |